US009775071B2

(12) United States Patent
Chen et al.

(10) Patent No.: US 9,775,071 B2
(45) Date of Patent: Sep. 26, 2017

(54) TDD CONFIGURATIONS AND EIMTA IN LTE

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 14/609,395

(22) Filed: Jan. 29, 2015

(65) Prior Publication Data

US 2015/0245247 A1 Aug. 27, 2015

Related U.S. Application Data

(60) Provisional application No. 61/944,000, filed on Feb. 24, 2014.

(51) Int. Cl.
| | |
|---|---|
| *H04W 72/04* | (2009.01) |
| *H04W 28/06* | (2009.01) |
| *H04L 5/14* | (2006.01) |
| *H04W 28/26* | (2009.01) |
| *H04B 7/14* | (2006.01) |
| *H04W 72/00* | (2009.01) |

(52) U.S. Cl.
CPC ............. *H04W 28/065* (2013.01); *H04L 5/14* (2013.01); *H04W 28/26* (2013.01); *H04W 72/00* (2013.01)

(58) Field of Classification Search
CPC ........... H04W 72/042; H04W 72/0446; H04W 72/1289

USPC .......................................... 370/280, 329, 336
See application file for complete search history.

(56) References Cited

U.S. PATENT DOCUMENTS 9,413,450 B2 *    8/2016   Seo .................... H04B 7/15542
2011/0176461 A1 *  7/2011   Astely ................. H04B 7/2656
                                                      370/280
(Continued)

FOREIGN PATENT DOCUMENTS

| EP | 2696516 A2 | 2/2014 |
|---|---|---|
| WO | 2010049587 A1 | 5/2010 |

(Continued)

OTHER PUBLICATIONS

International Search Report and Written Opinion—PCT/US2015/014115—ISA/EPO—dated May 4, 2015.

*Primary Examiner* — Charles C Jiang
*Assistant Examiner* — Will Lin
(74) *Attorney, Agent, or Firm* — Nerrie M. Zohn

(57) ABSTRACT

A method, an apparatus, and a computer program product for wireless communication are provided. The apparatus configures a radio frame with a subframe configuration based on a restriction, the radio frame being part of a sequence of a plurality of radio frames. The restriction excludes the radio frame from conforming to a set of subframe configurations based on at least one of a position of the radio frame within the sequence of radio frames or a type of information to be transmitted or received in the radio frame. The apparatus then communicates with a user equipment (UE) during the radio frame based on the subframe configuration.

30 Claims, 17 Drawing Sheets

1000

| Subframe Number → | 0 | 1 | 2 | 3 | 4 | 5 | 6 | 7 | 8 | 9 |
|---|---|---|---|---|---|---|---|---|---|---|
| Configuration 1' → | D | D | D | D | D | D | D | D | D | D |
| Configuration 2' → | D | S | D | D | D | D | D | D | D | D |
| Configuration 3' → | U | U | U | U | U | U | U | U | U | U |

(56) References Cited

U.S. PATENT DOCUMENTS

| | | | |
|---|---|---|---|
| 2013/0114472 A1* | 5/2013 | Tamaki | H04L 1/1854 370/280 |
| 2013/0176887 A1* | 7/2013 | Seo | H04B 7/024 370/252 |
| 2014/0022961 A1 | 1/2014 | Park et al. | |
| 2014/0086112 A1* | 3/2014 | Stern-Berkowitz | H04W 72/1289 370/280 |
| 2014/0112280 A1* | 4/2014 | Lee | H04W 72/04 370/329 |
| 2014/0219131 A1* | 8/2014 | Yang | H04W 24/10 370/252 |
| 2015/0358133 A1* | 12/2015 | Kusashima | H04W 76/04 370/280 |
| 2016/0198450 A1* | 7/2016 | Wei | H04L 1/00 370/329 |

FOREIGN PATENT DOCUMENTS

| | | | |
|---|---|---|---|
| WO | 2012155323 A1 | 11/2012 | |
| WO | 2012161914 A1 | 11/2012 | |

\* cited by examiner

| Uplink-Downlink Configuration | Downlink to Uplink Switch Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 8

| Subframe Number | 0 | 1 | 2 | 3 | 4 | 5 | 6 | 7 | 8 | 9 |
|---|---|---|---|---|---|---|---|---|---|---|
| Configuration 1' | D | D | D | D | D | D | D | D | D | D |
| Configuration 2' | D | S | D | D | D | D | D | D | D | D |
| Configuration 3' | U | U | U | U | U | U | U | U | U | U |

FIG. 10

TDD CONFIGURATIONS AND EIMTA IN LTE

CROSS-REFERENCE TO RELATED APPLICATION(S)

This application claims the benefit of U.S. Provisional Application Ser. No. 61/944,000, entitled "NEW TDD CONFIGURATIONS AND EIMTA IN LTE" and filed on Feb. 24, 2014, which is expressly incorporated by reference herein in its entirety.

BACKGROUND

Field

The present disclosure relates generally to communication systems, and more particularly, to new time division duplex (TDD) configurations and evolved interference management for traffic adaptation (eIMTA) in LTE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A wireless communication system may support a TDD frame structure, which provides flexibility in the allocation of wireless resources by allowing dynamic implementation of different UL-DL subframe configurations for TDD frames based on traffic demands. The dynamic implementation of different UL-DL subframe configurations is also known as evolved interference management for traffic adaptation (eIMTA).

SUMMARY

When employing eIMTA, a wireless communication system supporting a TDD frame structure typically implements one of several different UL-DL subframe configurations for a TDD frame. The wireless communication system may allow dynamic adaptation of the UL-DL subframe configurations based on actual traffic needs. For example, a UE may dynamically determine the UL-DL subframe configuration for a TDD frame by receiving downlink control information (DCI) from a base station in a DL subframe. However, the current UL-DL subframe configurations may not provide optimal throughput when, for example, large amounts of data need to be transmitted from one network device (e.g., a user equipment (UE)) to another network device (e.g., an eNB).

In order achieve optimal throughput, new UL-DL subframe configurations (also referred to as candidate subframe configurations) may be introduced. For example, a candidate subframe configuration may configure all subframes in a TDD frame as UL subframes to increase throughput of UL heavy traffic. As another example, a candidate subframe configuration may configure all subframes in a TDD frame as DL subframes to increase throughput of DL heavy traffic. The introduction of such candidate subframe configurations may raise various issues that may degrade system performance. One example issue is that when a UE is configured for standalone operation (e.g., where no cross carrier is available for control channel assignment), such candidate subframe configurations may prevent dynamic adaptation of the UL-DL subframe configurations. As an example, if a candidate subframe configuration configures all subframes in a TDD frame as UL subframes, a UE may not be able to receive the DCI needed to dynamically determine the UL-DL subframe configuration for the TDD frame. Another example issue is that the candidate subframe configurations may not provide a UE configured for standalone operation adequate physical random access channel (PRACH) opportunities.

An eNB implementing eIMTA may address the issues discussed above by restricting a subset of the radio frames from being configured with the candidate subframe configurations. For example, in a radio frame where at least one UE is configured to monitor a group common DCI, the eNB may restrict the radio frame from being configured with a subframe configuration where all subframes are configured as uplink subframes. As such, the eNB can ensure the UE an opportunity (e.g., at least one subframe configured as a downlink subframe) to monitor the group common DCI. Conversely, in a radio frame where no UEs are configured to monitor the group common DCI, the eNB may allow the radio frame to be configured with a subframe configuration where all subframes are configured as uplink subframes.

In another aspect, an eNB may configure UEs to monitor group common DCI in even radio frames, but may allow the odd radio frames to be configured with a candidate subframe configuration where all subframes are configured as uplink subframes. In this aspect the eNB may restrict even radio frames from being configured with candidate subframe configuration where all subframes are configured as uplink subframes.

Accordingly, in an aspect of the disclosure, a method, a computer program product, and an apparatus are provided, where the apparatus configures a radio frame with a subframe configuration based on a restriction. The restriction excludes the radio frame from conforming to one or more excluded subframe configurations based on at least one of a position of the radio frame (e.g., odd frame or even frame) within a sequence of radio frames or a type of information to be transmitted or received in the radio frame. The apparatus then communicates with a user equipment (UE) during the radio frame based on the subframe configuration.

In an aspect of the disclosure, a method, a computer program product, and an apparatus are provided. The apparatus receives information including a subframe configuration restriction for at least one radio frame, the at least one radio frame being configured with a subframe configuration based on the subframe configuration restriction that excludes the at least one radio frame from conforming to one or more excluded subframe configurations and communicates with a base station during the at least one radio frame based on the subframe configuration.

BRIEF DESCRIPTION OF THE DRAWINGS

FIG. 8 is a diagram illustrating subframe configurations for a TDD radio frame structure.

FIG. 10 is a diagram illustrating examples of candidate subframe configurations for a TDD radio frame structure in accordance with various aspects of the present disclosure.

DETAILED DESCRIPTION

Figure 1:
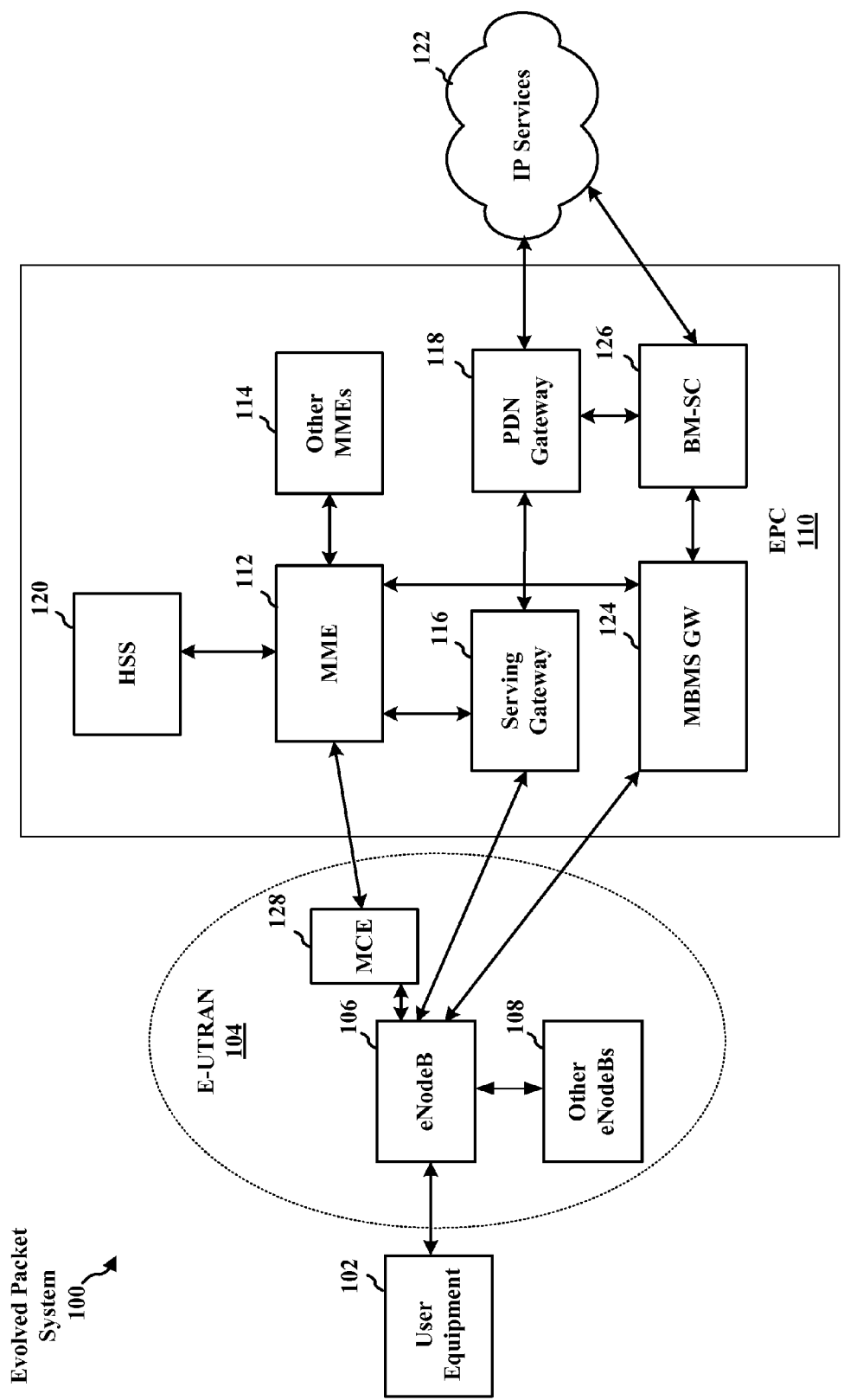
FIG. 1 is a diagram illustrating an example of a network architecture.

The detailed description set forth below in connection with the corresponding drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an eNode B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
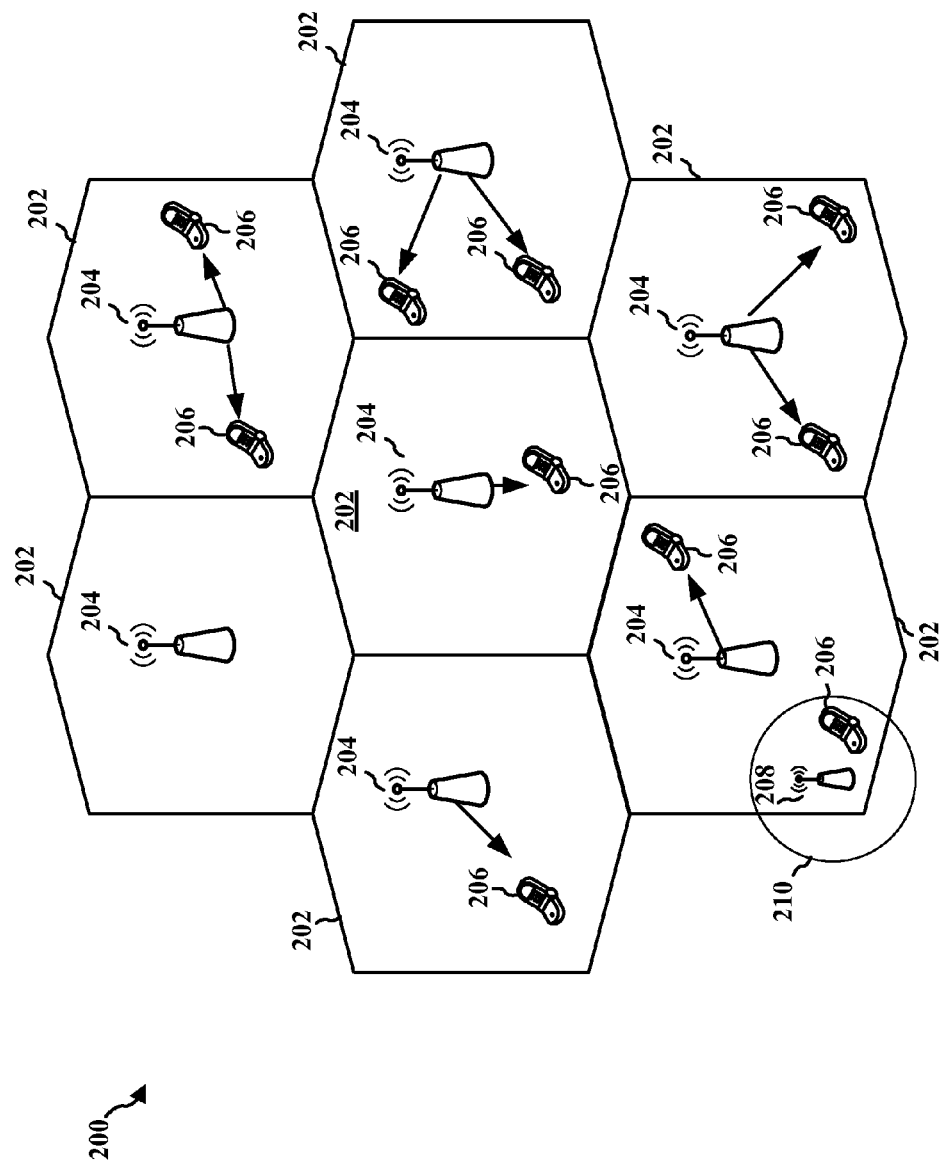
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
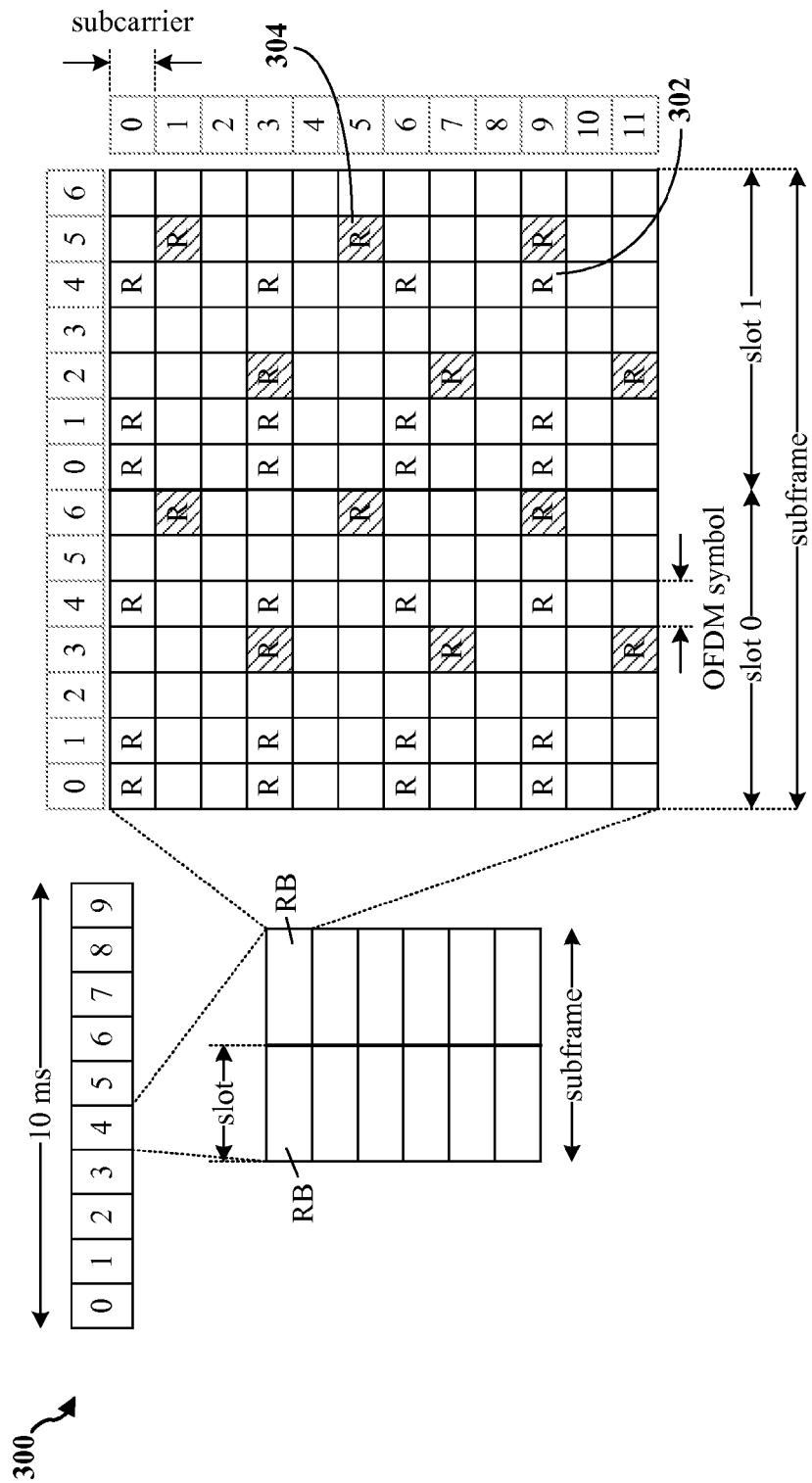
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
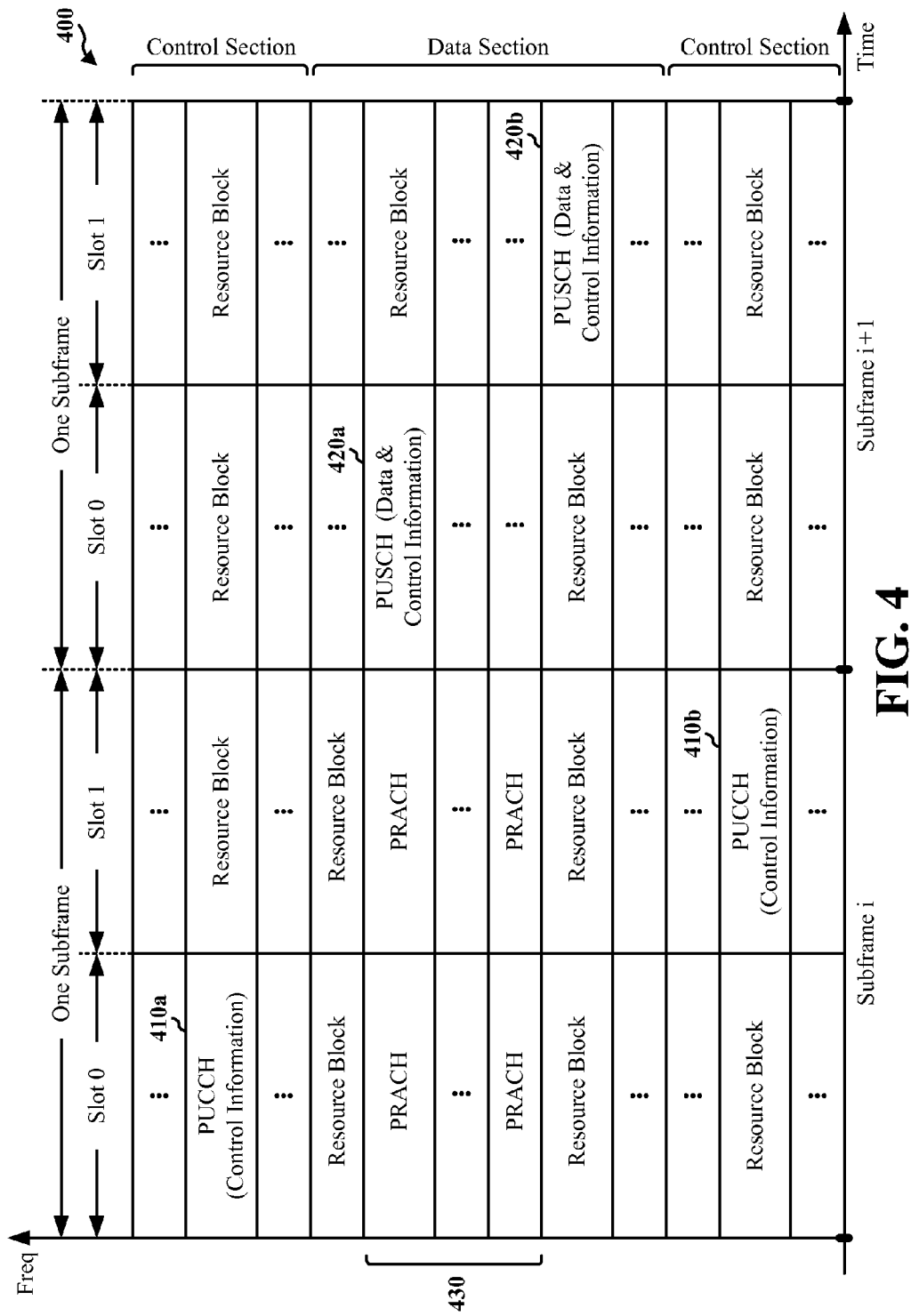
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
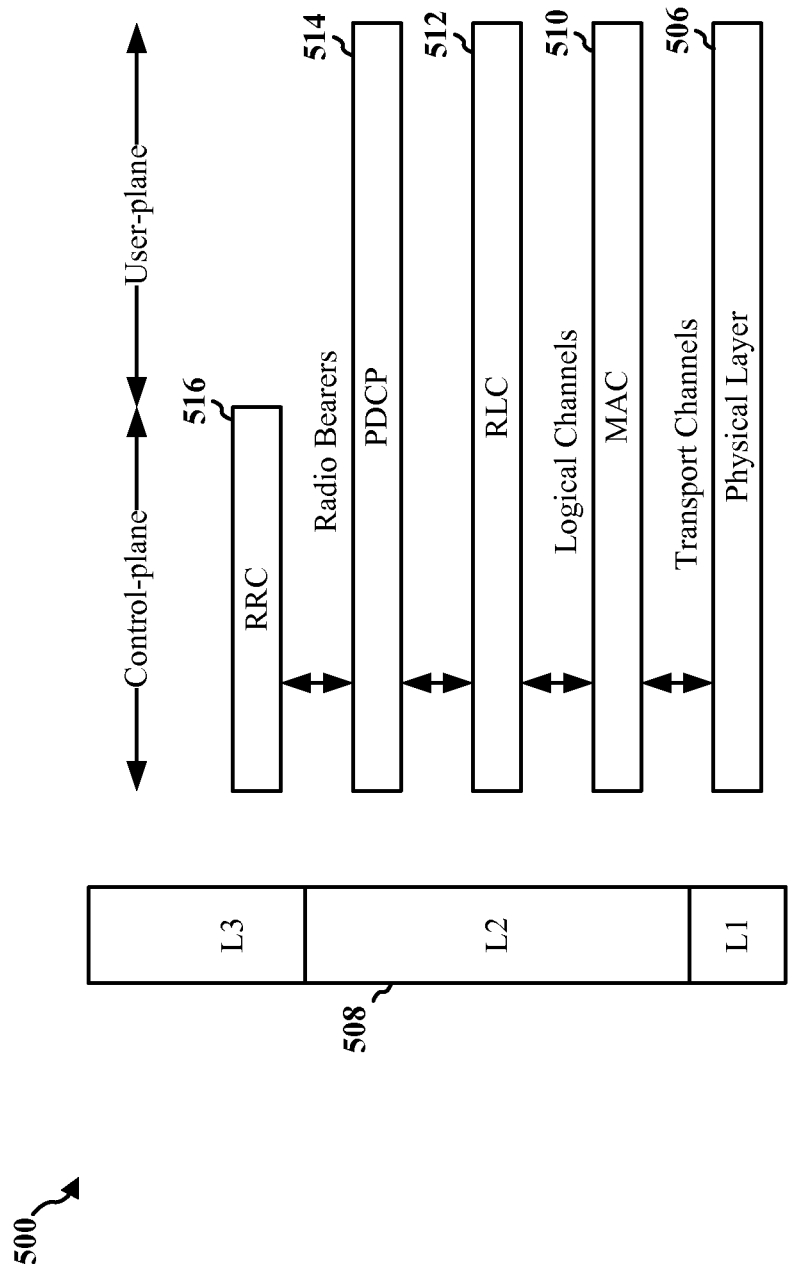
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
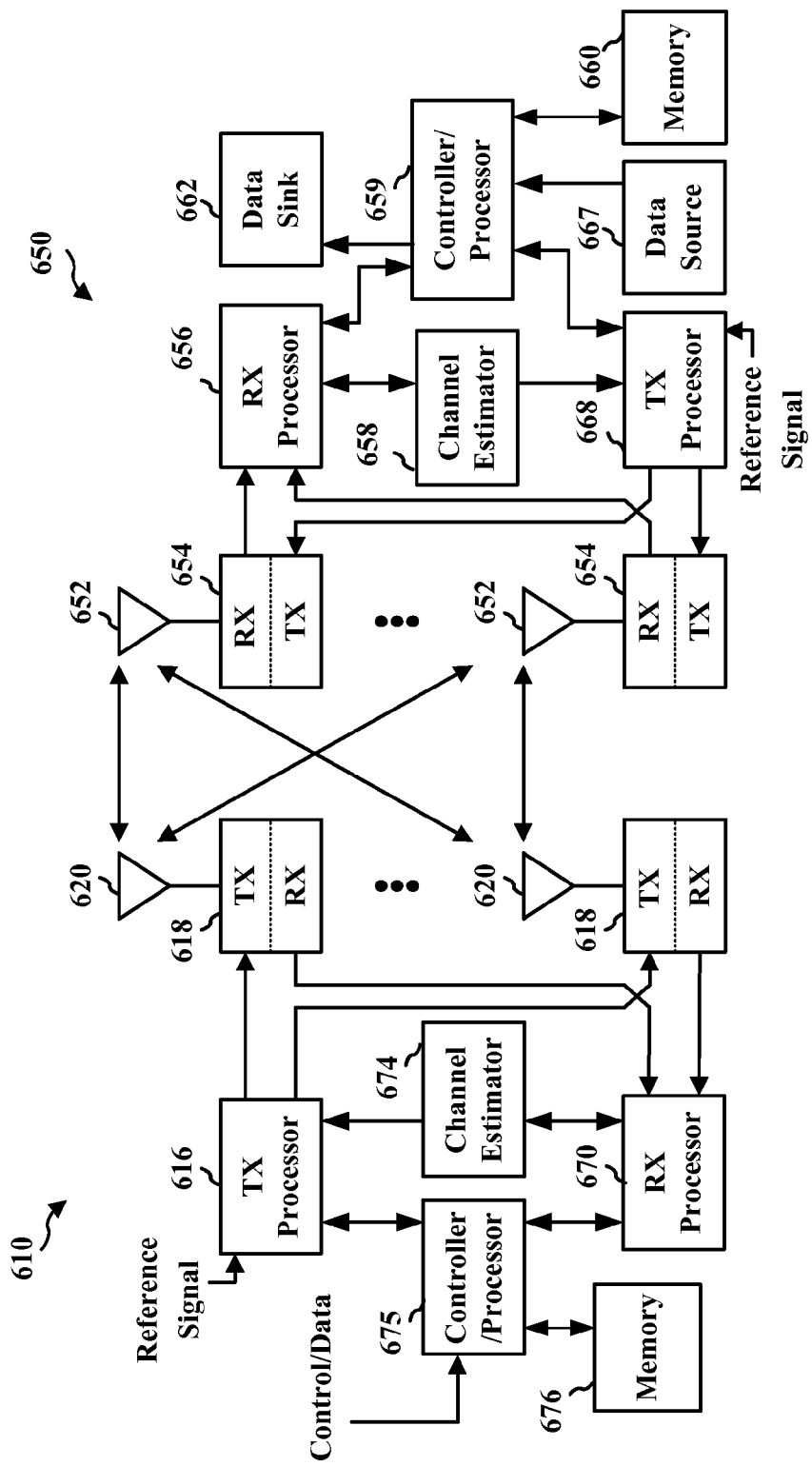
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phaseshift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
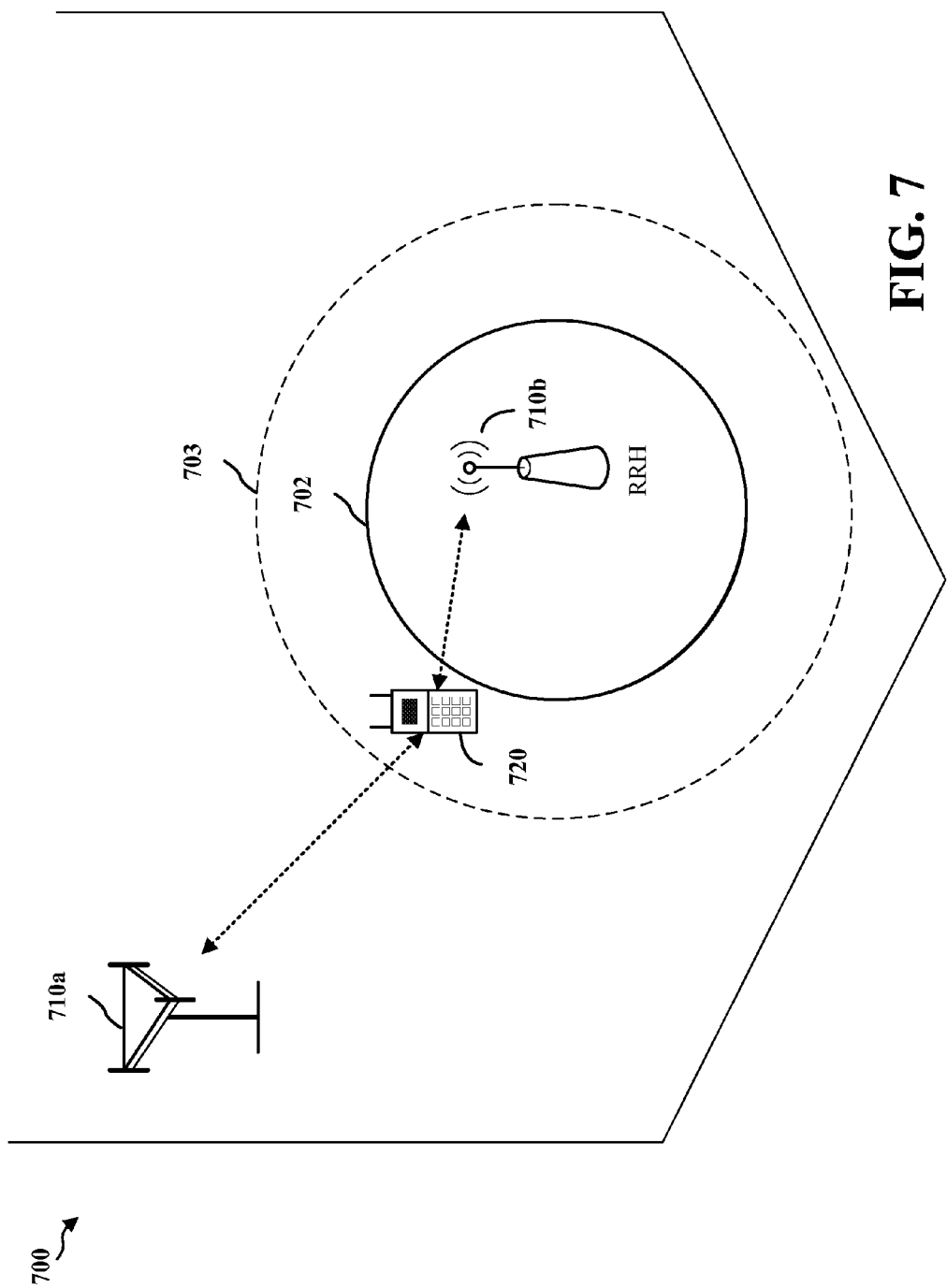
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

FIG. 8 is a diagram 800 illustrating subframe configurations for a TDD frame structure. As shown in FIG. 8, a TDD frame structure may include 10 subframes (e.g., subframes 0-9) and may support seven possible subframe configurations (e.g., UL-DL subframe configurations 0-6). In the aspect of FIG. 8, the subframe configurations have one of two possible switching periodicities (e.g., 5 ms and 10 ms). As shown in FIG. 8, the subframe configurations with a 5 ms switching periodicity include two special subframes (e.g., indicated as "S" in FIG. 8) per frame and the subframe configurations with a 10 ms switching periodicity include one special subframe per frame.

Figure 9:
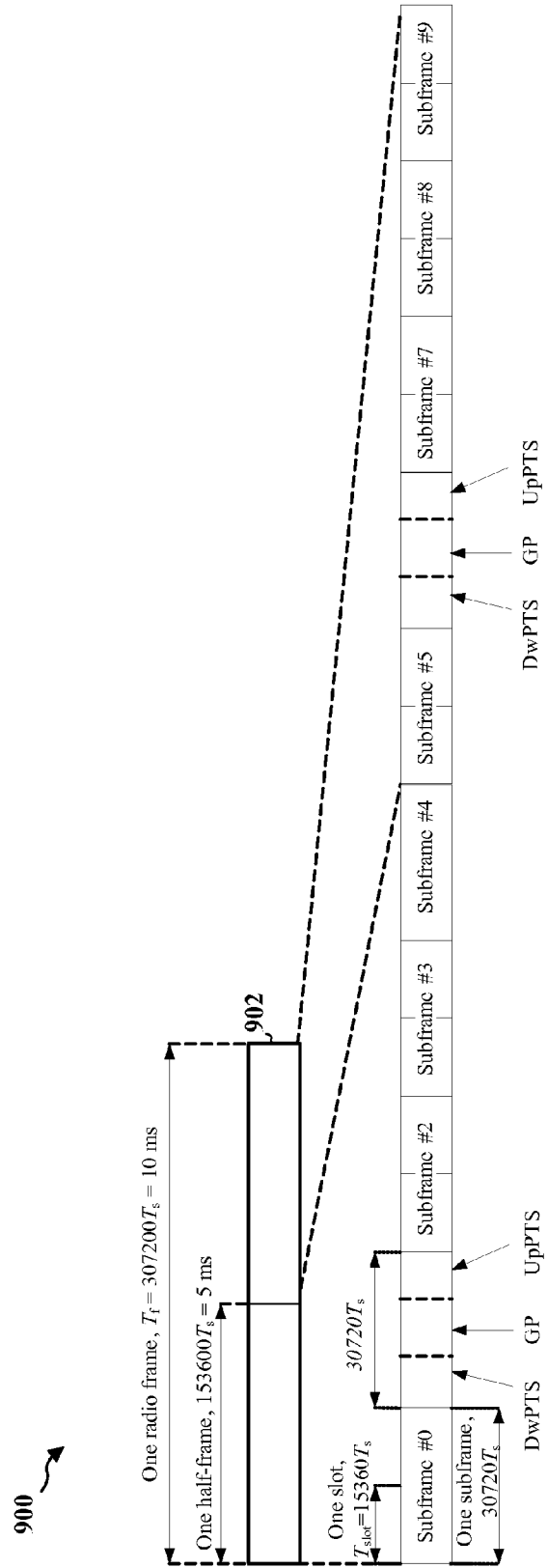
FIG. 9 is a diagram illustrating an LTE radio frame structure.

FIG. 9 is a diagram 900 illustrating an LTE frame structure. As shown in FIG. 9, one radio frame 902 may be configured to include 10 subframes (e.g., subframe 0 through subframe 9). As further shown in FIG. 9, each subframe may include two slots. In an aspect, the radio frame in FIG. 9 may be configured with a subframe configuration from the seven subframe configurations (e.g., UL-DL configurations 0-6) previously described with respect to FIG. 8. For example, if the radio frame in FIG. 9 is configured with subframe configuration 3 in FIG. 8, subframes 0 and 5-9 may be configured as DL subframes, subframes 2-4 may be configured as uplink subframes, and subframe 1 may be configured as a special subframe.

FIG. 10 is a diagram 1000 illustrating examples of candidate subframe configurations for a TDD frame structure in accordance with various aspects of the present disclosure. The candidate subframe configurations may be implemented to improve system performance by increasing throughput when, for example, large amounts of data need to be transmitted from one network device (e.g., a UE) to another network device (e.g., an eNB). As shown in FIG. 10, all of the subframes in candidate subframe configuration 1' are DL subframes, whereas all of the subframes in candidate subframe configuration 3' are UL subframes. Other UL-heavy subframe configurations may be possible. As further shown in FIG. 10, subframes 0 and 2-9 in candidate subframe configuration 2' are DL subframes and subframe 1 is a special subframe (indicated as "S" in FIG. 10). The special subframe may follow existing special subframe configurations or a new special subframe configuration. While described in the present disclosure as candidate subframe configurations 1', 2', and 3', such candidate subframe configurations may be appended to the existing LTE TDD configurations (e.g., existing UL-DL subframe configurations 0-6 described with respect to FIG. 8).

When employing eIMTA, LTE-TDD UL-DL subframe configurations may be dynamically adapted based on the actual traffic needs. For example, if during a short duration a large data burst on the downlink is needed, the subframe configuration may be changed from subframe configuration 1 (6 DL:4 UL) to subframe configuration 5 (9 DL:1 UL). In an aspect, the adaptation of the TDD subframe configuration is expected to be no slower than 640 ms. In another aspect, the adaptation of the TDD subframe configuration may be as fast as 10 ms. The TDD UL-DL subframe configuration may be dynamically indicated to one or more UEs via explicit layer 1 signaling using a UE-group-common physical downlink control channel (PDCCH) or enhanced PDCCH (ePDCCH).

The adaptation of the TDD UL-DL subframe configurations may also cause additional complexity in DL/UL HARQ management. In an aspect, to simplify HARQ management, a reference UL-DL subframe configuration may be used. For example, for UL HARQ, scheduling and HARQ timing may be based on the DL/UL subframe configuration as indicated in system information block (SIB) 1. For DL HARQ, an eNB (e.g., eNB 710*a*) may indicate to a UE (e.g., UE 720) to use one reference subframe configuration selected from subframe configurations 2, 4, and 5. In eIMTA, some subframes may not be subject to dynamic change of transmission directions, while some subframes may be subject to dynamic adaptation of the subframe configurations. In an aspect, DL subframes in the TDD UL-DL subframe configuration in SIB1 may not be subject to dynamic adaptation. Similarly, UL subframes in the DL HARQ reference configuration may not be subject to dynamic adaptation.

In one first aspect, the example candidate subframe configurations 1', 2', and/or 3' discussed supra with respect to FIG. 10 may be implemented in a multi-carrier arrangement. In an aspect, eNB 710*a* may not designate carriers subject to candidate subframe configurations 1', 2', and/or 3' as non-standalone carriers. In an aspect, such carriers may still be subject to eIMTA. In an aspect, eNB 710*a* may only implement eIMTA within the candidate subframe configurations 1', 2', and/or 3'. For example, dynamic TDD UL-DL subframe configurations for these carriers may only be allowed among candidate subframe configurations 1', 2', and/or 3'. However, such aspect may provide limited eIMTA adaptation. In another aspect, eNB 710*a* may implement eIMTA among the candidate subframe configurations 1', 2', and/or 3', and the seven possible subframe configurations (e.g., UL-DL subframe configurations 0-6) previously discussed with respect to FIG. 8. For example, eNB 710*a* may configure these carriers using any of the UL-DL subframe configurations 0-6. Accordingly, this aspect provides more flexible adaptation in response to traffic needs. In an aspect, eNB 710*a* may implement mechanisms to indicate that these carriers are not supporting standalone operation. For example, eNB 710*a* may define these carriers as a secondary carrier only band or barred access in SIBs.

While, the candidate subframe configurations 1', 2', and/or 3' may be easily employed between an eNB (e.g., eNB 710*a*) and a UE (e.g., UE 720) implementing carrier aggregation, standalone single carrier operation would be adversely impacted or incompatible in the absence of further implementation changes. For example in a single carrier implementation, when a radio frame is configured with candidate subframe configuration 1' or 2', UE 720 may not be afforded any opportunity to transmit control and/or data channels on the uplink, since candidate subframe configurations 1' and 2' lack a dedicated UL subframe for UL operations. As another example, when a radio frame is configured with candidate subframe configuration 3' (or a variation thereof), there is either no DL or no sufficient number of DL subframes available for backward compatible mobility management (e.g., RSRP measurement).

In an aspect, a carrier supporting some or all of the candidate subframe configurations 1', 2', and/or 3' may still be subject to eIMTA (e.g., dynamic configuration of UL-DL subframe configuration). However, it should be noted that UE 720 needs to monitor the group common DCI to dynamically determine the subframe configuration for a frame for a carrier. If the DCI is transmitted by eNB 710*a* on a carrier subject to eIMTA in a frame configured with candidate subframe configuration 3', UE 720 may not have an opportunity to decode the DCI since such a frame does not have a DL subframe for transmission of the DCI. In an aspect, UE 720 may be configured to monitor the group common DCI every 10 ms, 20 ms, 40 ms, or 80 ms.

In an aspect, an eNB implementing eIMTA may restrict certain radio frames from being configured with certain subframe configurations. For example, in a radio frame where at least one UE is configured to monitor the group common DCI, an eNB implementing eIMTA may restrict the radio frame from being configured with candidate subframe configuration 3'. As another example, in a radio frame where no UEs are configured to monitor the group common DCI, an eNB implementing eIMTA may allow the radio frame to be configured with candidate subframe configuration 3'. In a related aspect, an eNB may configure all UEs to monitor group common DCI in even radio frames and, as a result, the eNB may restrict even radio frames from being configured with candidate subframe configuration 3', but may allow the odd radio frames to be configured with candidate subframe configuration 3'. Conversely, the eNB may configure all UEs to monitor group common DCI in odd radio frames and may allow the even radio frames to be configured with candidate subframe configuration 3'.

In an aspect, when eNB 710*a* implementing eIMTA may potentially configure a carrier with the candidate subframe configurations 1', 2, and/or 3', eNB 710*a* may indicate in SIB1 an existing standalone compatible configuration. For example, with reference to FIG. 8, the SIB1 may indicate the UL-DL subframe configuration 5.

The candidate subframe configurations (e.g., candidate subframe configuration 1' and/or 3') may not support operation of a PRACH procedure. For example, since candidate subframe configuration 1' includes all DL subframes and candidate subframe configuration 3' includes all UL subframes, candidate subframe configurations 1' and 3' do not include any subframes (e.g., special subframes) that provide an opportunity for performing both DL and UL communications associated with a PRACH procedure.

In an aspect, eNB 710a may implement eIMTA so as to be compatible with PRACH operations. For example, eNB 710a may ensure that PRACH opportunities indicated in SIB1 are available to the UEs during eIMTA operation.

In an aspect, if eNB 710a has indicated a PRACH opportunity to UE 720, eNB 710a may use a subframe configuration that ensures availability of the PRACH opportunity. For example, a SIB1 transmitted to UE 720 may indicate that only PRACH format 4 is supported, with the possible PRACH configuration indices 48, 49, or 50. The parameters associated with PRACH configuration indices 48, 49, and 50 are indicated in Table 1.

TABLE 1

| PRACH configuration Index | Preamble Format | Density Per 10 ms ($D_{RA}$) | Version ($r_{RA}$) |
| --- | --- | --- | --- |
| 48 | 4 | 0.5 | 0 |
| 49 | 4 | 0.5 | 1 |
| 51 | 4 | 1 | 0 |

For example, with reference to Table 1, PRACH configuration indices 48 and 49 may be introduced to indicate that one PRACH format 4 opportunity occurs every 20 ms. For example, PRACH configuration index 48 may indicate that the PRACH format 4 opportunity occurs in subframe 1 of even frames, whereas PRACH configuration index 49 may indicate that the PRACH format 4 opportunity occurs in subframe 1 of odd frames. As another example, with reference to Table 1, PRACH configuration index 51 may indicate that one PRACH format 4 opportunity occurs every 10 ms. For example, PRACH configuration index 51 may further indicate that the PRACH format 4 opportunity occurs in subframe 1 of every frame. In an aspect, if PRACH configuration index 48 is indicated in SIB1, the eNB ensures that for even frames, the corresponding TDD UL-DL subframe configuration will always have subframe 1 allocated as a special subframe with PRACH format 4 available. However, the eNB may use any non-backward compatible/standalone-incapable configurations in odd frames. Conversely, if PRACH configuration index 49 is indicated in SIB1, eNB 710a ensures that for odd frames, the corresponding TDD UL-DL subframe configuration will always have subframe 1 allocated as a special subframe with PRACH format 4 available. However, eNB 710a may use any non-backward compatible/standalone-incapable configurations in even frames.

In an aspect, if PRACH configuration index 51 is used, eNB 710a may implement eIMTA by applying either candidate subframe configuration 2' or any one of the seven subframe configurations (e.g., UL-DL configurations 0-6) previously described with respect to FIG. 8.

Figure 11:
FIG. 11 is a diagram illustrating subframe configurations for a sequence of radio frames in accordance with various aspects of the present disclosure.

FIG. 11 is a diagram 1100 illustrating subframe configurations for a sequence of radio frames (e.g., radio frame 0 1102 to radio frame N 1114) in accordance with various aspects of the present disclosure. In one example, eNB 710a may apply PRACH configuration index 48, where PRACH format 4 opportunities occur in subframe 1 of even radio frames (e.g., radio frame 0 1102, radio frame 2 1106, and radio frame 4 1110 in FIG. 11) in the sequence of radio frames. In the example configuration of FIG. 11, the even radio frames (e.g., radio frame 0 1102, radio frame 2 1106, and radio frame 4 1110) have a limited set of possible UL-DL subframe configurations for dynamic subframe configuration adaptation. In the example configuration of FIG. 11, eNB 710a restricts even radio frames from the candidate subframe configurations 1' and 3'. Therefore, only those subframe configurations with subframe #1 allocated as a special subframe may be allowed in the even radio frames. As further shown in FIG. 11, the odd radio frames (e.g., radio frame 1 1104, radio frame 3 1108, and radio frame 5 1112) have an unlimited set of possible UL-DL subframe configurations for dynamic subframe configuration adaptation. However, eNB 710a may limit the set of possible UL-DL subframe configurations based on message 3 needs and other potential needs. It can be appreciated that similar designs may be applied to other PRACH formats.

The previously discussed PRACH dependent eIMTA operation may be driven by cell-specific PRACH opportunities for allowing UE 720 an opportunity to access a cell. In an aspect, when eNB 710a detects that at least one UE (e.g., UE 720) is attempting to access the cell using PRACH and initiates a PRACH procedure, eNB 710a may restrict the UL-DL subframe configurations available for a radio frame to facilitate the PRACH procedure and any subsequent operations. For example, eNB 710a applying PRACH configuration index 48 may transmit a SIB1 that indicates UL-DL subframe configuration 5. The eNB 710a may detect PRACH format 4 in subframe 1 of radio frame 0 1102 and may transmit a random access response (message 2) in subframe 0 of radio frame 1 1104. Since there is at least a 6 ms delay between message 2 and message 3 of the PRACH procedure, UE 720 may then determine, based on SIB1, to expect message 3 in subframe 2 of radio frame 2 1106. As a result, eNB 710a should have a UL-DL subframe configuration in which subframe 2 is a regular UL subframe, such as any of the seven subframe configurations (e.g., UL-DL configurations 0-6) previously described with respect to FIG. 8.

In an aspect, for RRC_connected UEs, an eNB (e.g., eNB 710a) may further indicate to new UEs via dedicated signaling of frame-dependent eIMTA restrictions. In an aspect, legacy UEs may assume the subframe configuration is based on SIB1 and/or the dynamically indicated UL-DL subframe configurations, if they are eIMTA-capable. In an aspect, new UEs and legacy UEs may be configured to monitor different group DCIs for dynamic UL-DL subframe configuration.

It should be noted that when candidate subframe configuration 3' including all UL subframes is implemented for a TDD frame of a carrier, the UE 720 may not be able to perform measurements in such a TDD frame. More specifically, since candidate subframe configuration 3' includes all UL subframes (and no DL subframes), the candidate subframe configuration 3' may prevent the UE 720 from measuring any DL signals.

In an aspect, eNB 710a may indicate to UE 720 that measurements may be performed by UE 720 in a certain subset of radio frames for a particular carrier. Therefore, eNB 710a may prevent UE 720 from attempting to perform measurements in every radio frame in the sequence. For example, eNB 710a may indicate to UE 720 that UE 720 may perform measurements in any even radio frame in the sequence of radio frames. However, there is no guaranteed availability of DL subframes for measurement in the odd radio frames. This also implies that different radio frames may have different eIMTA limitations. In an aspect, eNB 710a may restrict even radio frames from candidate subframe configuration 3', but may allow candidate subframe configuration 3' for odd radio frames.

In an aspect, the UE 720 may not receive an indication from the eNB 710a as to which subframes that the UE 720 should perform measurements. In such aspect, the UE 720 may blindly detect the subframe direction (DL or UL) and perform measurements accordingly. For example, if UE 720 determines that a subframe in a radio frame is a UL subframe, UE 720 may avoid performing a measurement in that UL subframe. However, if the UE 720 determines that a subframe is a DL subframe, UE 720 may perform measurements in that DL subframe.

Figure 12:
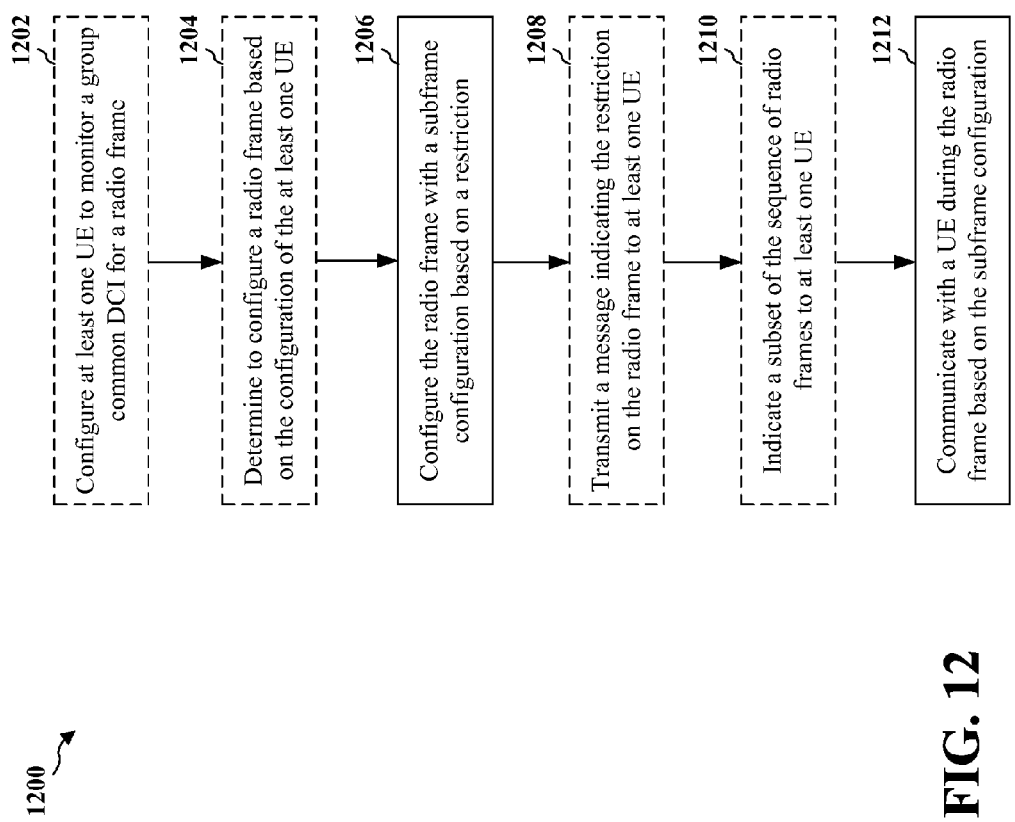
FIG. 12 is a flow chart of a method of wireless communication.

FIG. 12 is a flow chart 1200 of a method of wireless communication. The method may be performed by an eNB (e.g., eNB 710a in FIG. 7). It should be understood that the steps indicated by dashed lines in FIG. 12 represent optional steps.

At step 1202, the eNB configures at least one UE to monitor a group common DCI for a radio frame. The UE may monitor DL subframes in order to decode the group common DCI. The group common DCI may enable the UE to dynamically determine the UL-DL subframe configuration for a TDD frame.

At step 1204, the eNB determines to configure the radio frame based on the configuration of the at least one UE.

At step 1206, the eNB configures the radio frame with a subframe configuration based on a restriction. In an aspect, the restriction excludes the radio frame from conforming to one or more excluded subframe configurations based on at least one of a position of the radio frame within a sequence of radio frames or a type of information to be transmitted or received in the radio frame. In an aspect, the one or more excluded subframe configurations do not include at least one downlink subframe allocation when the type of information to be transmitted in the radio frame is downlink control information. In an aspect, the one or more excluded subframe configurations do not include at least one of an uplink subframe allocation or a special subframe allocation when the type of information to be received in the radio frame is PRACH information.

In an aspect, a first radio frame is excluded from conforming to a first set of subframe configurations and a second radio frame is excluded from conforming to a second set of subframe configurations, where the first set of subframe configurations is different from the second set of subframe configurations. In an aspect, the second set of subframe configurations contains null set. In an aspect, the first set of subframe configurations contains at least one of a subframe configuration without any regular uplink subframe or a subframe configuration without any regular downlink subframe.

At step 1208, the eNB transmits a message indicating the restriction on the radio frame to at least one UE. In an aspect, a PRACH configuration index is indicated to at least one UE, where the PRACH configuration index is associated with a PRACH having a periodicity of two or more radio frames.

At step 1210, the eNB indicates a subset of the sequence of radio frames to at least one UE. In an aspect, the subset of the sequence of radio frames is configured with a subframe configuration with at least one downlink subframe allocation to enable measurements by the at least one UE.

At step 1212, the eNB communicates with a UE (e.g., UE 720 in FIG. 7) of the at least one UE during the radio frame based on the subframe configuration. For example, when the subframe configuration for the radio frame includes all downlink subframes, the eNB communicates with the UE by transmitting to the UE during the radio frame. As another example, when the subframe configuration for the radio frame includes all uplink subframes, the eNB communicates with the UE by receiving transmissions from the UE during the radio frame.

Figure 13:
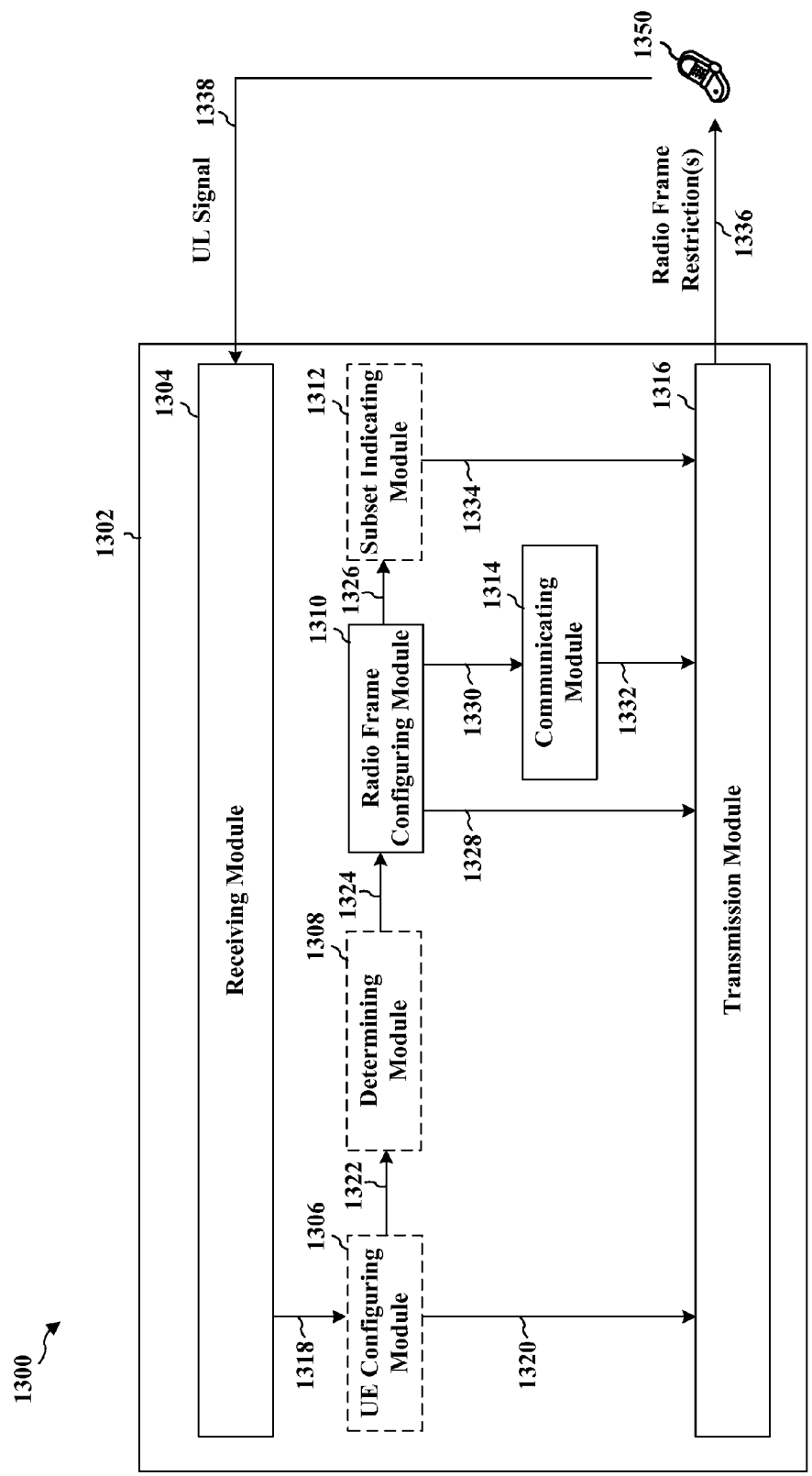
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be an eNB. Receiving module 1304 receives UL signals 1338 from one or more UEs (e.g., UE 1350). UE configuring module 1306 receives one or more of the UL signals via signal 1318 from receiving module 1304, and configures at least one UE to monitor a group common DCI in a radio frame. Determining module 1308 determines how to configure the radio frame based on the configuration 1322 of the at least one UE. Radio frame configuring module 1310 configures the radio frame indicated in signal 1324 with a subframe configuration based on a restriction. Subset indicating module 1312 receives a signal 1326 indicating the subframe configuration and provides a signal 1334 indicates a subset of the sequence of radio frames to at least one UE. Communicating module 1314 receives a signal 1330 indicating the subframe configuration and communicates with a UE during the radio frame based on the subframe configuration. Transmission module 1316 transmits a message indicating the restriction on the radio frame to at least one UE (e.g., UE 1350). For example, the transmission module 1314 may send a communication included in signal 1332 to the UE via the transmission module 1316. As another example, the radio frame configuring module 1310 may send a signal 1328 indicating the subframe configuration to the UE via the transmission module 1316. Accordingly, the signal 1336 may indicate one or more radio frame restrictions to the UE. As another example, the UE configuring module 1306 may send a signal 1320 indicating the configuration from UE configuring module 1306 to the UE via the transmission module 1316.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
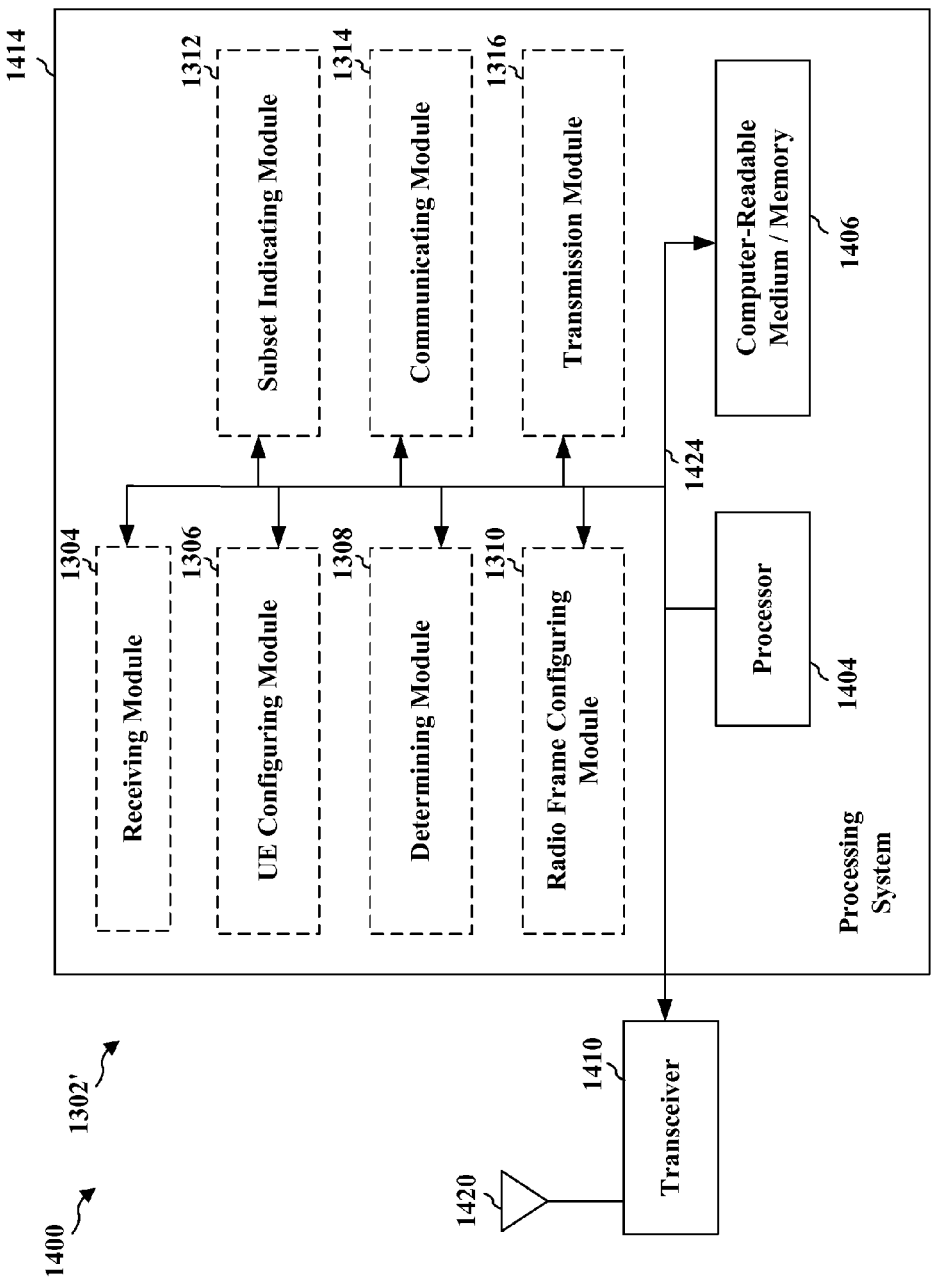
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, 1314, and 1316, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1316, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308, 1310, 1312, 1314, and 1316. The modules may be software modules running in the processor 1404, resident/stored in the computer readable medium/memory 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1302/1302' for wireless communication includes means for configuring a radio frame with a subframe configuration based on a restriction, means for communicating with a UE during the radio frame based on the subframe configuration, means for transmitting a message indicating the restriction on the radio frame to at least one UE, means for indicating a subset of the sequence of radio frames to at least one UE, means for configuring at least one UE to monitor a group common DCI for the radio frame, means for determining to configure the radio frame based on the configuration of the at least one UE. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 15:
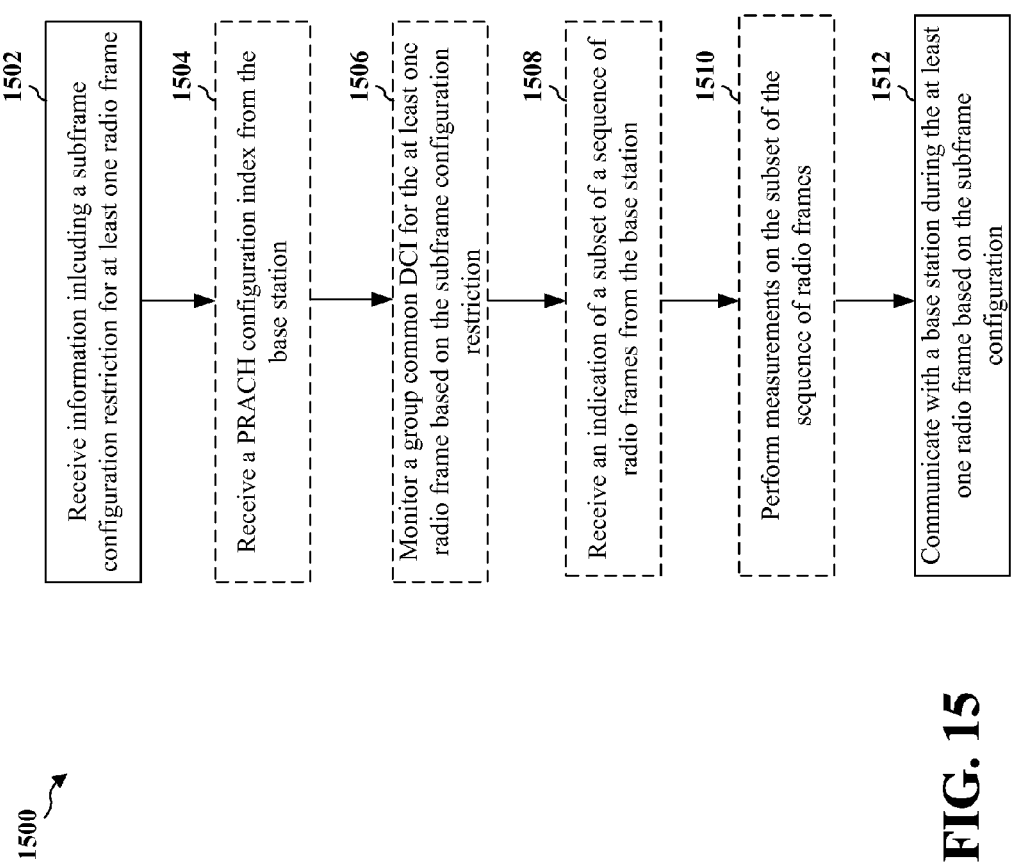
FIG. 15 is a flow chart of a method of wireless communication.

FIG. 15 is a flow chart 1500 of a method of wireless communication. The method may be performed by a UE. It should be understood that the steps indicated by dashed lines in FIG. 15 represent optional steps.

At step 1502, the UE receives information including a subframe configuration restriction for at least one radio frame. In an aspect, the at least one radio frame may be configured with a subframe configuration based on the subframe configuration restriction that excludes the at least one radio frame from conforming to one or more excluded subframe configurations. In an aspect, the one or more excluded subframe configurations are based on at least one of a position of the at least one radio frame within a sequence of radio frames or a type of information to be transmitted or received in the at least one radio frame. In an aspect, the one or more excluded subframe configurations do not include at least one downlink subframe allocation when a type of information to be received in the at least one radio frame comprises downlink control information. In an aspect, the one or more excluded subframe configurations do not include at least one of an uplink subframe allocation or a special subframe allocation when a type of information to be received in the at least one radio frame comprises PRACH. In an aspect, a first radio frame of the at least one radio frame is excluded from conforming to a first set of subframe configurations and a second radio frame of the at least one radio frame is excluded from conforming to a second set of subframe configurations, where the first set of subframe configurations is different from the second set of subframe configurations. In an aspect, the second set of subframe configurations contains a null set. In an aspect, the first set of subframe configurations contains at least one of a subframe configuration without any regular uplink subframe or a subframe configuration without any regular downlink subframe.

At step 1504, the UE receives a PRACH configuration index from the base station. In an aspect, the PRACH configuration index may be associated with a PRACH periodicity of two or more radio frames.

At step 1506, the UE monitors a group common DCI for the at least one radio frame based on the subframe configuration restriction.

At step 1508, the UE receives an indication of a subset of a sequence of radio frames from the base station. In an aspect, the subset of the sequence of radio frames is configured with a subframe configuration with at least one downlink subframe allocation.

At step 1510, the UE performs measurements on the subset of the sequence of radio frames.

Finally, at step 1512, the UE communicates with a base station during the at least one radio frame based on the subframe configuration.

Figure 16:
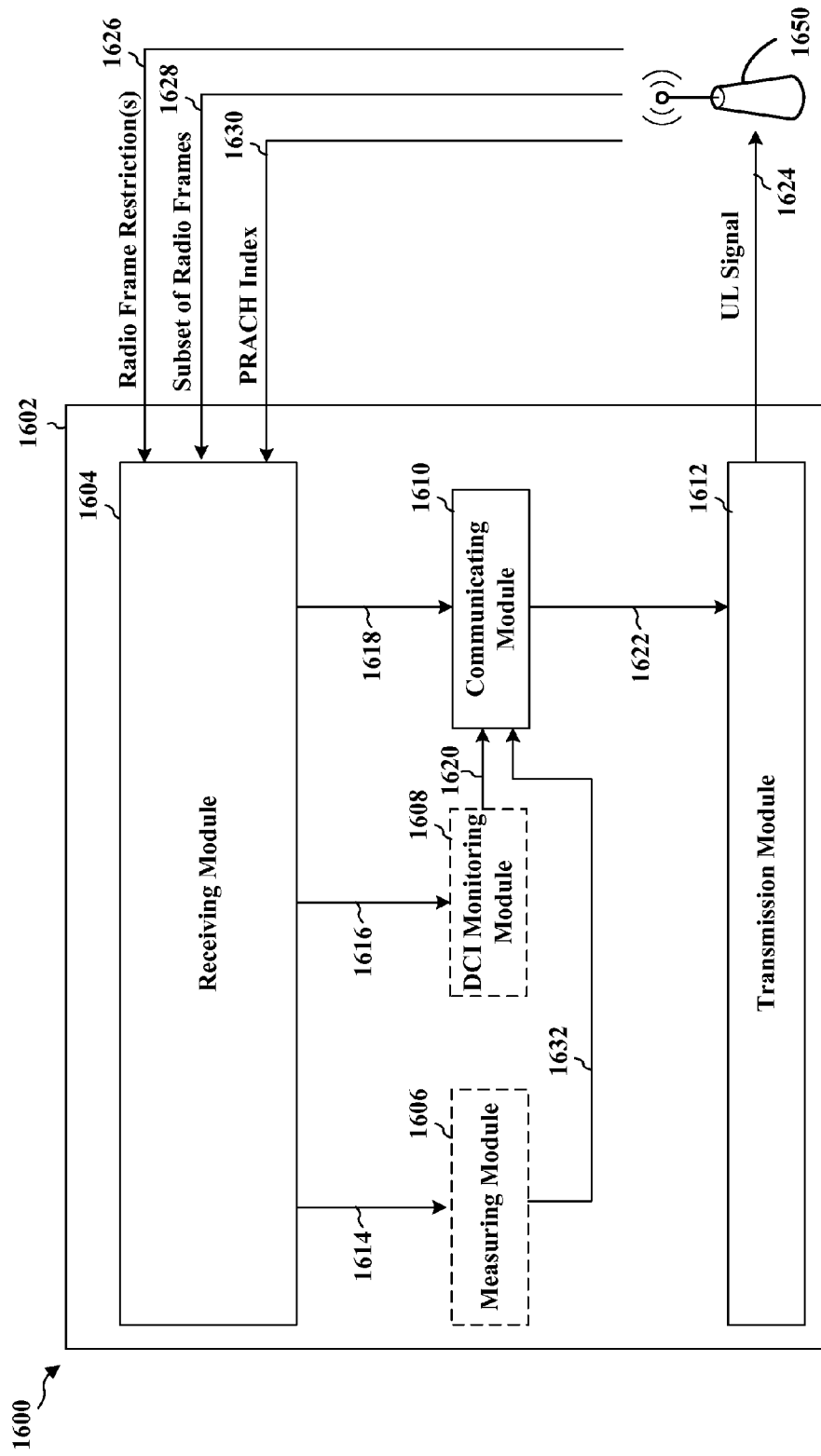
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be a UE (e.g., UE 720 in FIG. 7). Receiving module 1604 receives information 1626 including a subframe configuration restriction for at least one radio frame, receives an indication 1628 of a subset of a sequence of radio frames, and receives a PRACH configuration index 1630 from the base station 1650. Measuring module 1606 receives a signal 1614 indicating the subset of a sequence of radio frames and performs measurements on the subset of the sequence of radio frames. DCI monitoring module 1608 receives a signal 1616 indicating the subframe configuration restriction for at least one radio frame and monitors a group common DCI for the at least one radio frame based on the subframe configuration restriction. Communicating module 1610 receives a signal 1618 indicating at least one radio frame being configured with a subframe configuration based on the subframe configuration restriction and that receives a signal 1620 indicating a DCI, communicates with a base station during the at least one radio frame based on the subframe configuration and the DCI, and communicates with the base station based on measurements 1632 provided by the module 1606. Transmission module 1612 sends UL signals 1624 to a base station (e.g., base station 1650). For example, the transmission module 1610 may send a communication included in signal 1622 to the base station 1650 via the module 1612.

The apparatus may include additional modules that perform each of the steps of the algorithm in the aforementioned flow chart of FIG. 15. As such, each step in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
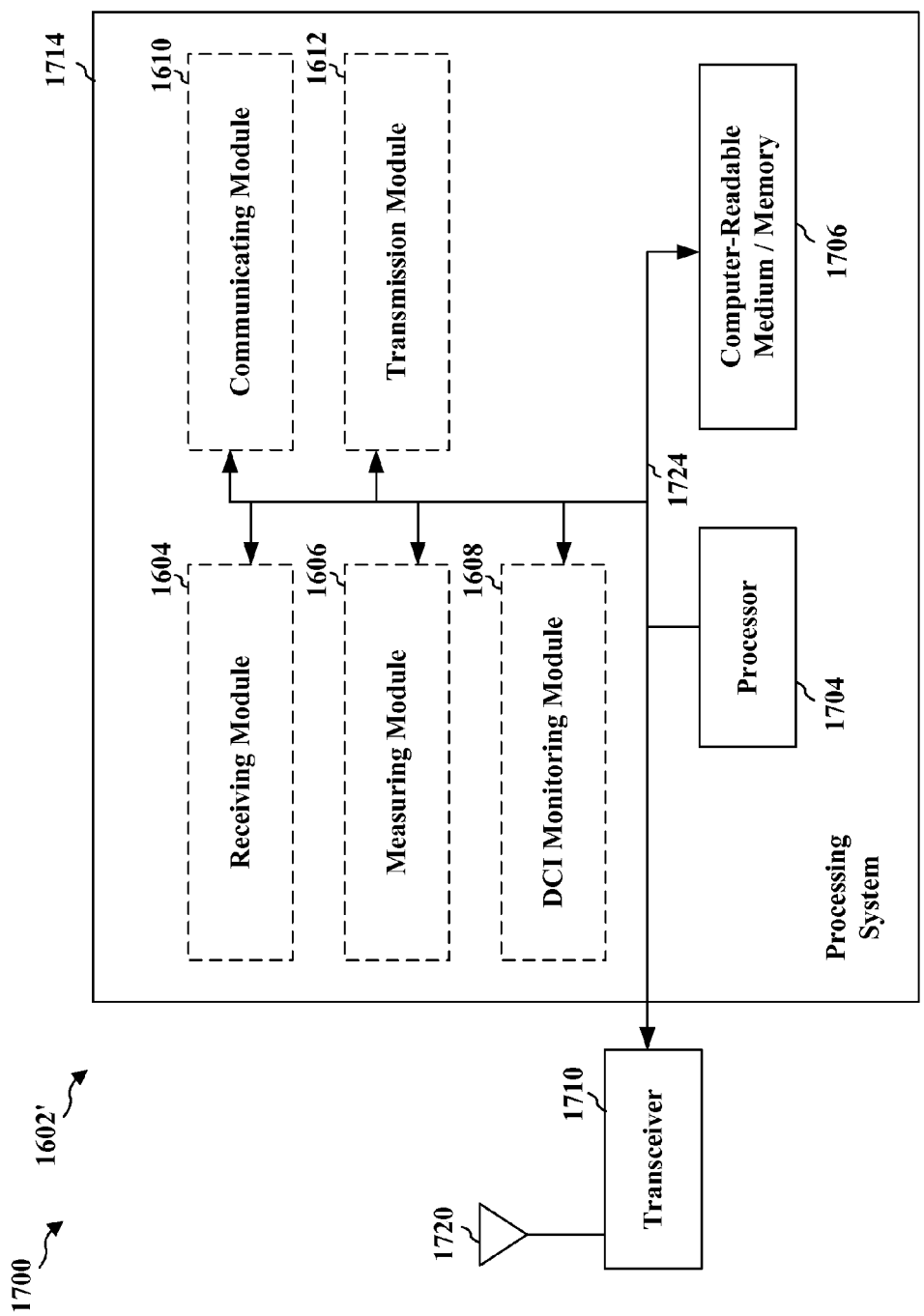
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, and 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the receiving module 1604. In addition, the transceiver 1710 receives information from the processing system 1714, specifically the transmission module 1612, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1604, 1606, 1608, 1610, and 1612. The modules may be software modules running in the processor 1704, resident/stored in the computer readable medium/memory 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for receiving information comprising a subframe configuration restriction for at least one radio frame, means for communicating with a base station during the at least one radio frame based on the subframe configuration, means for receiving an indication of a subset of a sequence of radio frames from the base station, wherein the subset of the sequence of radio frames is configured with a subframe configuration with at least one downlink subframe allocation, means for performing measurements on the subset of the sequence of radio frames, means for monitoring a group common DCI for the at least one radio frame based on the subframe configuration restriction, means for receiving a PRACH configuration index from the base station, wherein the PRACH configuration index is associated with a PRACH periodicity of two or more radio frames. The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a base station, comprising:

configuring a radio frame with a subframe configuration from a set of subframe configurations; and communicating with a user equipment (UE) during the radio frame based on the subframe configuration, wherein the radio frame is part of a sequence of a plurality of radio frames, and the subframe configuration is limited based on a restriction that excludes the radio frame from conforming to a subset of the set of subframe configurations, the subset of subframe configurations being determined based on at least one of:
a position of the radio frame within the sequence of radio frames, or
a type of information to be transmitted or received in the radio frame, wherein the subset of subframe configurations are determined based on downlink control information (DCI) to be transmitted in the radio frame, and wherein the restriction excludes a subset of subframe configurations without at least one downlink subframe allocation.

2. The method of claim 1, wherein at least a portion of the sequence of the plurality of radio frames are restricted to exclude the portion from conforming to the subset of subframe configurations.

3. The method of claim 1, further comprising transmitting a message indicating the restriction on the radio frame to at least one UE.

4. The method of claim 1, further comprising indicating a subset of the sequence of the plurality of radio frames to at least one UE, wherein the subset is configured with a subframe configuration with at least one downlink subframe allocation to enable measurements by the at least one UE.

5. The method of claim 1, further comprising configuring at least one UE to monitor a group common DCI for the radio frame.

6. The method of claim 5, further comprising determining to configure the radio frame based on the configuration of the at least one UE.

7. The method of claim 1, where the radio frame is a first radio frame, and the subset of subframe configurations is a first set of subframe configurations the method further comprising:
limiting a second radio frame, from the sequence of the plurality of radio frames, from conforming to a second set of subframe configurations, wherein the first set of subframe configurations is different from the second set of subframe configurations.

8. The method of claim 7, wherein the first set of subframe configurations contain at least one of a subframe configuration without any regular uplink subframe or a subframe configuration without any regular downlink subframe.

9. A method of wireless communication at a user equipment, comprising:
receiving a subframe configuration restriction for a radio frame from a base station; and
communicating with the base station during the radio frame based on the subframe configuration,
wherein the radio frame is part of a sequence of a plurality of radio frames, and the subframe configuration restriction excludes the radio frame from conforming to a set of subframe configurations,
wherein the set of subframe configurations are based on at least one of a position of the radio frame within the sequence of radio frames or a type of information to be transmitted or received in the radio frame,
wherein the set of subframe configurations are based on the downlink control information (DCI) to be received in the radio frame, and wherein the subframe configuration restriction excludes the radio frame from conforming to a set of subframe configurations without a subframe configuration with at least one downlink subframe allocation.

10. The method of claim 9, wherein at least a portion of the sequence of the plurality of radio frames are restricted to exclude the portion from conforming to the set of subframe configurations.

11. The method of claim 9, wherein the set of subframe configurations are based on at least one of a position of the radio frame within the sequence of radio frames or a type of information to be transmitted or received in the radio frame.

12. The method of claim 9, further comprising:
receiving an indication of a subset of the sequence of the plurality of radio frames from the base station, wherein the subset is configured with a subframe configuration with at least one downlink subframe allocation; and
performing measurements on the subset of the sequence of radio frames.

13. The method of claim 9, further comprising monitoring a group common DCI for the radio frame based on the subframe configuration restriction.

14. The method of claim 13, wherein the first set of subframe configurations contains at least one of a subframe configuration without any regular uplink subframe or a subframe configuration without any regular downlink subframe.

15. The method of claim 9, wherein a first radio frame is excluded from conforming to a first set of subframe configurations and a second radio frame is excluded from conforming to a second set of subframe configurations, wherein the first set of subframe configurations is different from the second set of subframe configurations.

16. An apparatus for wireless communication at a base station, comprising:
a memory; and
at least one processor coupled to the memory, and configured to:
configure a radio frame with a subframe configuration from a set of subframe configurations; and
communicate with a user equipment (UE) during the radio frame based on the subframe configuration,
wherein the radio frame is part of a sequence of a plurality of radio frames, and the subframe configuration is limited based on a restriction that excludes the radio frame from conforming to a subset of the set of subframe configurations, the subset of subframe configurations being determined based on at least one of:
a position of the radio frame within the sequence of radio frames, or
a type of information to be transmitted or received in the radio frame,
wherein the subset of subframe configurations are determined based on the type of information to be transmitted in the radio frame and the type of information to be transmitted comprises downlink control information (DCI), and
wherein the restriction excludes a subset of subframe configurations without at least one downlink subframe allocation.

17. The apparatus of claim 16, wherein the at least one processor is further configured to transmit a message indicating the restriction on the radio frame to at least one UE.

18. The apparatus of claim 16, wherein the at least one processor is further configured to indicate a subset of the sequence of the plurality of radio frames to at least one UE, wherein the subset of the sequence of the plurality of radio frames is configured with a subframe configuration with at least one downlink subframe allocation to enable measurements by the at least one UE.

19. An apparatus for wireless communication at a user equipment, comprising:
   a memory; and
   at least one processor coupled to the memory, and configured to:
      receive a subframe configuration restriction for a radio frame from a base station; and
      communicate with the base station during the radio frame based on the subframe configuration,
   wherein the radio frame is part of a sequence of a plurality of radio frames, and the subframe configuration restriction excludes the radio frame from conforming to a set of subframe configurations,
   wherein the set of subframe configurations are based on the downlink control information (DCI) to be received in the radio frame, and wherein the subframe configuration restriction excludes the radio frame from conforming to a set of subframe configurations without a subframe configuration with at least one downlink subframe allocation.

20. The apparatus of claim 19, wherein the at least one processor is further configured to:
   receive an indication of a subset of the sequence of the plurality of radio frames from the base station, wherein the subset is configured with a subframe configuration with at least one downlink subframe allocation; and
   perform measurements on the subset of the sequence of radio frames.

21. The apparatus of claim 19, wherein the at least one processor is further configured to monitor a group common DCI for the radio frame based on the subframe configuration restriction.

22. The apparatus of claim 19, wherein the set of subframe configurations are based on at least one of a position of the radio frame within a sequence of radio frames or a type of information to be transmitted or received in the radio frame.

23. A method of wireless communication at a base station, comprising:
   configuring a radio frame with a subframe configuration from a set of subframe configurations; and
   communicating with a user equipment (UE) during the radio frame based on the subframe configuration,
   wherein the radio frame is part of a sequence of a plurality of radio frames, and the subframe configuration is limited based on a restriction that excludes the radio frame from conforming to a subset of the set of subframe configurations, the subset of subframe configurations being determined based on at least one of:
      a position of the radio frame within the sequence of radio frames, or
      a type of information to be transmitted or received in the radio frame,
   wherein the subset of subframe configurations are determined based on the radio frame comprising physical random access channel (PRACH) information to be transmitted in the radio frame, and
   wherein the restriction excludes a subset of subframe configurations without at least one of an uplink subframe allocation or a special subframe allocation.

24. The method of claim 23, wherein a PRACH configuration index is indicated to at least one UE, wherein the PRACH configuration index is associated with a PRACH periodicity of two or more radio frames.

25. A method of wireless communication at a user equipment, comprising:
   receiving a subframe configuration restriction for a radio frame from a base station; and
   communicating with the base station during the radio frame based on the subframe configuration,
   wherein the radio frame is part of a sequence of a plurality of radio frames, and the subframe configuration restriction excludes the radio frame from conforming to a set of subframe configurations,
   wherein the set of subframe configurations are based on the radio frame comprising physical random access channel (PRACH) information, and
   wherein the subframe configuration restriction excludes the radio frame from conforming to a set of subframe configurations without at least one of an uplink subframe allocation or a special subframe allocation.

26. The method of claim 25, further comprising receiving a PRACH configuration index from the base station, wherein the PRACH configuration index is associated with a PRACH periodicity of two or more radio frames.

27. An apparatus for wireless communication at a base station, comprising:
   a memory; and
   at least one processor coupled to the memory, and configured to:
      configure a radio frame with a subframe configuration from a set of subframe configurations; and
      communicate with a user equipment (UE) during the radio frame based on the subframe configuration,
   wherein the radio frame is part of a sequence of a plurality of radio frames, and the subframe configuration is limited based on a restriction that excludes the radio frame from conforming to a subset of the set of subframe configurations, the subset of subframe configurations being determined based on at least one of:
      a position of the radio frame within the sequence of radio frames, or
      a type of information to be transmitted or received in the radio frame,
   wherein the subset of subframe configurations are determined based on the type of information to be transmitted in the radio frame and the type of information to be received in the radio frame comprises physical random access channel (PRACH) information, and
   wherein the restriction excludes a subset of subframe configurations without at least one of an uplink subframe allocation or a special subframe allocation.

28. The apparatus of claim 27, wherein a PRACH configuration index is indicated to at least one UE, wherein the PRACH configuration index is associated with a PRACH periodicity of two or more radio frames.

29. An apparatus for wireless communication at a user equipment, comprising:
   a memory; and
   at least one processor coupled to the memory, and configured to:
      receive a subframe configuration restriction for a radio frame from a base station; and
      communicate with the base station during the radio frame based on the subframe configuration,
   wherein the radio frame is part of a sequence of a plurality of radio frames, and the subframe configuration restriction excludes the radio frame from conforming to a set of subframe configurations, wherein the set of subframe configurations are based on the radio frame comprising physical random access channel (PRACH) information, and wherein the subframe configuration restriction excludes the radio frame from conforming to a set of subframe configurations without at least one of an uplink subframe allocation or a special subframe allocation.

30. The apparatus of claim 29, wherein the at least one processor is further configured to receive a PRACH configuration index from the base station, wherein the PRACH configuration index is associated with a PRACH periodicity of two or more radio frames.

\* \* \* \* \*